(12) United States Patent
Peterman et al.

(10) Patent No.: US 12,071,038 B2
(45) Date of Patent: Aug. 27, 2024

(54) ENERGY SOURCE BALANCER

(71) Applicant: Rivian IP Holdings, LLC, Irvine, CA (US)

(72) Inventors: Andrew Peterman, Pacifica, CA (US); Ben Villagra, Palo Alto, CA (US); Trent Warnke, Novi, MI (US); Brian Wang, San Francisco, CA (US); Ryan Auker, San Francisco, CA (US)

(73) Assignee: Rivian IP Holdings, LLC., Irvine, CA (US)

( * ) Notice: Subject to any disclaimer, the term of this patent is extended or adjusted under 35 U.S.C. 154(b) by 0 days.

(21) Appl. No.: 17/811,611

(22) Filed: Jul. 11, 2022

(65) Prior Publication Data
US 2024/0010099 A1    Jan. 11, 2024

(51) Int. Cl.
| | | |
|---|---|---|
| *B60L 58/12* | (2019.01) | |
| *B60L 53/63* | (2019.01) | |
| *B60L 55/00* | (2019.01) | |
| *H02J 3/32* | (2006.01) | |

(52) U.S. Cl.
CPC ............. *B60L 58/12* (2019.02); *B60L 53/63* (2019.02); *B60L 55/00* (2019.02); *H02J 3/322* (2020.01)

(58) Field of Classification Search
CPC .................................................. B60L 53/67–68
See application file for complete search history.

(56) References Cited

U.S. PATENT DOCUMENTS

| | | | |
|---|---|---|---|
| 2009/0040029 A1* | 2/2009 | Bridges ............. | H02J 13/00028 340/12.51 |
| 2013/0211988 A1* | 8/2013 | Dorn ....................... | G08G 1/20 700/297 |
| 2015/0032661 A1* | 1/2015 | Manfield ................. | B60L 50/62 705/347 |
| 2015/0120068 A1* | 4/2015 | Lawrenson ............... | H02J 7/02 700/286 |
| 2019/0308513 A1* | 10/2019 | Akhavan-Tafti ....... | H04W 4/023 |
| 2020/0094698 A1* | 3/2020 | Imai ....................... | H04W 4/44 |
| 2021/0138928 A1* | 5/2021 | O'Gorman ......... | G06Q 30/0283 |
| 2022/0234459 A1* | 7/2022 | Auberger .............. | B60L 53/305 |

* cited by examiner

*Primary Examiner* — David V Henze-Gongola
(74) *Attorney, Agent, or Firm* — Foley & Lardner LLP

(57) ABSTRACT

Systems and methods for an energy source balancer are provided. The energy source balancer can predict an amount of electricity to charge a battery in a time interval. The energy source balancer can identify a charger connected to an electricity grid. The energy source balancer can determine, a portion of the electricity provided to the charger in the time interval via renewable energy sources. The charger can generate an action configured to offset any non-renewable energy provided.

20 Claims, 7 Drawing Sheets

ENERGY SOURCE BALANCER

INTRODUCTION

An energy grid, such as an electricity grid, can distribute energy from one or more energy sources to a load. The energy grid can include various energy sources, including renewable energy sources and non-renewable energy sources.

SUMMARY

Aspects of this technical solution can be directed to increasing a portion of renewable energy used to charge an electric vehicle, using an energy source balancer. A charge predictor of an energy source balancer can determine an amount of electricity to charge the battery of an electric vehicle. For example, the charge predictor can determine a difference between a current state of charge and a desired state of charge of the battery. A charger selector of the energy source balancer can identify a charger to charge the electric vehicle. The charger selector can determine additional charger information such as to ensure a compatibility or affiliation, or any energy offsets associated with the charger. For example, the charger selector can identify the charger based on the composition of an energy grid supplying electricity to the charger (e.g., can prioritize chargers having a higher content of renewable energy). The composition of the energy grid can be predicted by an emissions forecaster to identify the charger, or following identification of the charger. For example, the emissions forecaster can predict a future composition of an energy grid. The future composition of the energy grid can be at a time the electric vehicle is predicted to charge at the energy grid. The energy source balancer (e.g., the emissions forecaster) can reconcile the forecasted composition of the grid with another determined composition of the grid. For example, the emissions forecaster can determine the composition of the energy to charge the electric vehicle matched the predicted composition of the energy. An action generator can generate an action to offset any non-renewable portion of energy to charge the vehicle. For example, the action generator can adjust the operation (e.g., a route) of the electric vehicle to offset the non-renewable portion of the energy.

At least one aspect is directed to a system. The system can include one or more processors coupled with memory. The system can predict an amount of electricity to charge a battery of an electric vehicle. The prediction can be based at least in part on a state of charge of a battery of the electric vehicle. The system can identify a charger connected to an electricity grid configured to provide the amount of electricity to charge the battery. The system can determine a portion of electricity provided to the charger via renewable energy sources in the time interval. The system can generate an action to offset the difference between the amount of electricity to charge the battery and the portion of the amount of electricity provided via the one or more renewable energy sources in the time interval. The generation can be based on the portion less than the amount of electricity to charge the battery.

At least one aspect is directed to a method. The method can be performed by a data processing system that includes one or more processors coupled with memory. The method can include the data processing system predicting an amount of electricity to charge the battery of the electric vehicle in a time interval. The amount can be based least in part on a state of charge of a battery of the electric vehicle. The method can include the data processing system identifying a charger connected to an electricity grid configured to provide the amount of electricity to charge the battery. The method can include the data processing system determining, for the charger, a portion of the amount of electricity provided to the charger in the time interval via one or more renewable energy sources of the electricity grid. The method can include the data processing system generating an action configured to offset a difference between the amount of electricity to charge the battery and the portion of the amount of electricity provided via the one or more renewable energy sources in the time interval. The action can be based on the portion less than the amount of electricity.

At least one aspect is directed to an electric vehicle. The electric vehicle can include one or more processors coupled with memory. The electric vehicle can receive an indication from a user of the electric vehicle to charge a battery of the electric vehicle. The indication from the user can be received via a graphical user interface. The electric vehicle can determine an amount of electricity to charge the battery of the electric vehicle in a time interval. The determination can be responsive to the indication. The electric vehicle can identify a charger connected to an electricity grid configured to provide the amount of electricity to charge the battery. The electric vehicle can determine a portion of the amount of electricity provided to the charger in the time interval via one or more renewable energy sources of the electricity grid for the charger. The electric vehicle can provide an indication of an action configured to offset a difference between the amount of electricity to charge the battery and the portion of the amount of electricity provided via the one or more renewable energy sources in the time interval. The indication of the action can be provided via the graphical user interface. The indication of the action can be based at least in part on the portion less than the amount of electricity.

At least one aspect is directed to a graphical user interface. The graphical user interface can be presented, generated, or otherwise provided by one or more processors coupled with memory. The graphical user interface can display one or more chargers. A first portion of an amount of electricity provided to the one or more chargers is sourced from renewable energy sources. A second portion of the of the amount of electricity provided to the one or more chargers is sourced from non-renewable energy sources. The one or more chargers can be based on a location of a vehicle or an area of interest associated with the vehicle. The graphical user interface can receive a selection of a first charger. The graphical user interface can determine a portion of the amount of electricity provided to the first charger in a time interval via the second portion. The graphical user interface can generate an action configured to offset the second portion in the time interval.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
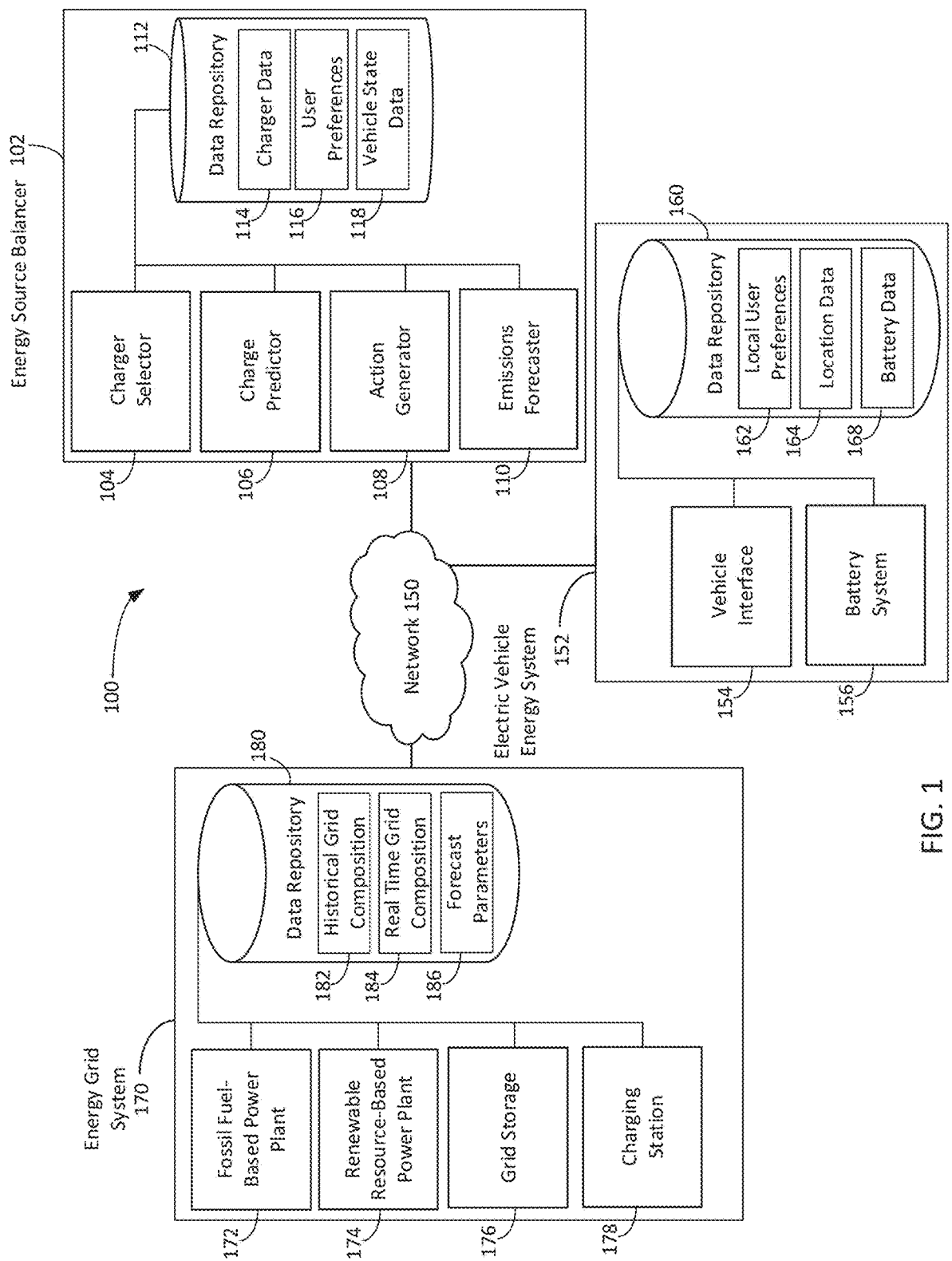
FIG. 1 depicts a system to balance energy use between energy sources, in accordance with some aspects.

Following below are more detailed descriptions of various concepts related to, and implementations of, methods, apparatuses, and systems of energy source balancers. The various concepts introduced above and discussed in greater detail below may be implemented in any of numerous ways.

The present disclosure is directed to systems and methods of increasing the amount of electricity used to charge an electric vehicle that is generated from renewable energy sources as opposed to non-renewable energy sources. Information related to energy sources such as a composition of an energy grid associated with a charger or an offset program associated with a charger can be predicted, determined, or accessed (e.g., via an API from an energy grid operator or third party aggregator). The information can be presented to a user, such as by a graphical user interface. A prompt to perform an action to offset a non-renewable portion of the energy can be presented to the user. The user can accept the prompt to perform the action, or the action can be performed by the electric vehicle. For example, the user can adjust a vehicle speed, or provide peak demand energy to a grid (e.g., in the future, or apply a previous provision of peak demand energy in the past to the action).

The disclosed solutions have technical advantages of lowering non-renewable energy use relative to renewable energy use, such as an amount of non-renewable energy associated with various chargers at various times. The chargers can be presented to the user to allow the user to select chargers having additional renewable energy composition. The disclosed solutions associate potential actions which can be performed (e.g., automatically, or responsive to the prompt of a user) to offset any nonrenewable energy used by an electric vehicle. For example, the nonrenewable can be offset based on predictions of energy grid composition and use.

Systems and methods of the present technical solution can include, interface with, or otherwise communicate with an energy source balancer, an electric vehicle energy system, and an energy grid system including a charger. The electric vehicle energy system can monitor the battery system of the electric vehicle and interface with the energy source balancer to determine requested power (e.g., based on the location and route of the electric vehicle). The energy source balancer can determine a request for charging. The energy source balancer can identify a charger which is compatible with the electric vehicle, and otherwise desired. For example, the energy source balancer can base the identification of the charger on a charging station renewable energy credit policy. The charger can prompt the user to charge the electric vehicle at the charger and determine, based on the energy composition of the energy grid, a portion of the electricity that is not already associated with an offset. The energy source balancer can generate an action to offset the nonrenewable energy and prompt the electric vehicle or the user to perform the action.

FIG. 1 depicts an example system 100 to balance energy sources, in accordance with some aspects. The system 100 can include, interface with or otherwise communicate with one or more energy grid systems 170. The system 100 can include, interface with or otherwise communicate with one or more energy source balancers 102. In some cases, the energy source balancer 102 can be referred to or include a data processing system. The system 100 can include, interface with or otherwise communicate with electric vehicle energy systems 152. The energy source balancer 102, electric vehicle energy system 152, and energy grid systems 170 can communicate via a network 150. The network 150 can include computer networks such as the Internet, local, wide, metro, or other area networks, intranets, cellular networks, satellite networks, and other communication networks such as voice or data mobile telephone networks.

The energy grid system 170 can include at least one fossil fuel-based power plant 172. The energy grid system 170 can include at least one renewable resource-based power plant 174. The energy grid system 170 can include at least one grid storage 176 element. The energy grid system 170 can include at least one charging station 178 which is also referred to herein as a charger 178. The energy grid system 170 can include at least one data repository 180.

The energy grid system 170 can include at least one fossil fuel-based power plant 172. The fossil fuel-based power plant 172 can be a plant intended to operate transiently, in response to a load (e.g., a gas peaker plant) or a plant intended for uninterrupted operation (e.g., a coal-fired plant). The fossil fuel-based power plant 172 can be associated with various emissions such as nitrous oxides and carbon dioxides. The energy grid system can include at least one renewable resource-based power plant 174. The renewable resource-based power plant 174 can include solar, wind, nuclear, geothermal, hydroelectric or other renewable energies. The renewable resource-based power plants 174 can be grid scale (e.g., in the megawatt range) or can be residential scale (e.g., in the kilowatt range). For example, the renewable resource-based power plants 174 can include rooftop residential solar energy sources. The energy grid system can include at least one element for grid storage 176. The grid storage can include grid scale or residential scale storage. For example, the grid storage 176 can include megawatt scale batteries, or fuels cells and kilowatt scale grid storage 176 such as electric vehicle batteries and residential energy storage devices.

The energy grid system 170 can include, interface with, or be connected to at least one charging station 178. The charging station 178 can provide electricity to the electric vehicle that is generated from any one or more power sources of the energy grid system 170. The charging station 178 can charge the electric vehicle using different characteristics of electricity. For example, a charging station 178 can be a high power AC or DC charger, a trickle charger (e.g., a 120 VAC charger), another electric vehicle, or a home charger. Some charging stations 178 can be associated with charging networks wherein certain parameters (e.g., renewable offsets, or plug type) can be inferred. Some charging stations 178, such as home chargers can have information associated by user entry or inter-device access such as through a common application or an API. For example, a power grid associated with a home charger may be the rooftop solar associated with the home, and can be accessed by interfacing with the rooftop solar (e.g., the panels, the inverter, or an energy storage device associated therewith).

The data repository 180 can include one or more local or distributed databases, and can include a database management system. The data repository 180 can include computer data storage or memory and can store one or more of a historical grid composition 182, a real time grid composition 184, and forecast parameters 186. The real time grid composition 184 can include current or most recent available records (e.g., estimates or measures) of the energy source composition of an energy grid. The historical grid composition 182 can include records of the energy source composition of an energy grid which is not real time grid composition 184. The forecast parameters 186 include parameters used to forecast a future state of the energy grid such as weather, holidays, or planned maintenance.

Historical grid composition 182 and real time grid composition 184 can be determined according to an attributional framework or a consequentialist framework. An attributional framework considers the total power generation of an energy grid, while a consequentialist framework considers an incremental power generation of the energy grid. For example, if an energy grid includes only peaker gas plants to manage transient demand, then an incremental change in demand can be associated with the emissions of the peaker gas plants, and without regard to the rest of the grid (which is not impacted by the incremental demand). If an energy grid includes only grid storage to manage transient demand, then the incremental change in demand can be associated with the emissions to generate electricity to charge the grid storage 176 elements.

The energy source balancer 102 can include at least one charger selector 104. The energy source balancer 102 can include at least one charge predictor 106. The energy source balancer 102 can include at least one action generator 108. The energy source balancer 102 can include at least one data repository 112.

The charger selector 104, charge predictor 106, and action generator 108 can each include at least one processing unit or other logic device such as a programmable logic array engine, or a module configured to communicate with the data repository 112 or database. The charger selector 104, charge predictor 106, and action generator 108 can be separate components, a single component, or part of the energy source balancer 102. The energy source balancer 102 can include hardware elements, such as one or more processors, logic devices, or circuits. For example, the energy source balancer 102 can include one or more components, structures of functionality of the computing device depicted in FIG. 7.

The data repository 112 can include one or more local or distributed databases, and can include a database management system. The data repository 112 can include computer data storage or memory and can store one or more of charger data 114, user preferences 116, and vehicle state data 118. The charger data 114 can include charger information such as a renewable offset policy associated with a charger. The user preferences 116 can include user preferences stored by the energy source balancer such as a preferred action to offset non-renewable energy use. The vehicle state data 118 can include vehicle state information such as current state of charge, or charge capacity.

Still referring to FIG. 1, among others, the energy source balancer 102 can include at least one charger selector 104 designed, constructed and operational to identify a charger connected to an energy grid. The charger selector 104 can identify the charging station 178 by brand, location, or a unique code such as an electric vehicle supply equipment identifier (EVSEID). The charger selector 104 can access information regarding the energy supplied to the charger and other information disclosed herein via an application programming interface (API). For example, the charger selector 104 can access an API to a grid operator, charger operator, or third party data host. The charger selector 104 can identify the charger 178 based on a compatible charging standard (e.g., with or without the use of an adapter which can be specified according to a user preference 116). The charger selector 104 can identify the charger 178 based on a charging network the vehicle is affiliated with. For example, a user preference 116 can specify one or more networks 150 that a user or an electrical vehicle is registered with. The charger selector 104 can rank (e.g., sort) or select a charger 178 based on a portion of renewable energy provided to the charger 178. For example, the charger 178 with the highest portion of the amount of electricity provided via the one or more renewable energy sources can be selected. The charger 178 can be selected based on the portion during various times. For example, based on a historical highest portion, a current highest portion, or a predicted highest portion.

The charger selector 104 can associate one or more charging stations 178 with a portion of renewable energy used in the grid (e.g., with or without offsets). For example, the charger selector 104 can determine a charging station 178 can generate all electricity from renewable sources, such as a local micro-grid including wind, solar, or hydroelectric energy, and can be determined to be 100% renewable energy. The charger selector 104 can associate another charging station 178 with another energy grid having a varying portion of renewable energy (e.g., based on a forecast parameter 186). Thus, the charger selector 104 can determine the renewable content of the charging station 178 according to the energy grid. A charging station 178 (e.g., a charging station type, brand, location, or other subset thereof) can be known to offset a portion of energy. For example, an operator of a charging station 178 can obtain renewable energy credits (RECs) to offset all or a portion of the energy delivered. The offset amount can be less than, equal to, or greater than the non-renewable portion of energy. For example, an operator can obtain RECs to offset 100% of energy used despite a lesser percent (e.g., 50%) of energy being non-renewable energy (e.g., can over-provision RECs), or can obtain RECs to offset 25% of energy used despite a greater percent (e.g., 50%) of energy being non-renewable energy.

The RECs can be associated with a total power use (e.g., 1 megawatt) so that 1 REC unit can offset 1 unit of used energy without regard to an energy intensity. For example, a REC can be used to offset coal or gas fired power plants based on an energy used. Some credits can offset carbon use generally, and can be used with the systems and methods provided herein. The renewable content can be a real time measure or a long term tabulated measure. For example, the charger selector 104 can associate a charger with a grid which is 50% renewable energy on an annualized basis; the grid can include 100% renewable energy during a windy Saturday in the summer, and 0% renewable energy during a still Tuesday night in the winter. The charger selector 104 can rank a plurality of charging stations 178. The ranked chargers can be presented via an interface or can be ranked and selected according to an intermediate processing operation. For example, preferred chargers (e.g., closer, having a higher renewable energy content, or having a user affiliation) can be given a higher rank than non-preferred chargers.

The charger selector 104 can determine a portion of the amount of electricity provided to the charging station 178 in a time interval via renewable energy resources. The charger selector 104 can access data of a data repository 180 associated with an energy grid such as an energy grid operator or based on a third party aggregator via an API. For example, the charger selector 104 can receive information relating to the energy grid detailing the portion of renewable energy. The portion of the energy can be constant during the time interval of charging, or can vary according to two or more sub-intervals thereof. For example, the charger selector 104 can access a real time grid composition 184 for a first segment of charging wherein 60% of energy is solar, and during a second segment of charging wherein 50% of charging is solar. The determination of the renewable portion can be made prospectively or retrospectively. For example, the charger selector 104 can access or determine predictions of the future composition of the grid based on forecast parameters 186, which can be accessible over the network 150.

The energy source balancer 102 can include at least one charge predictor 106 to predict an amount of electricity to charge a battery of an electric vehicle in a time interval. The prediction can be based on the state of charge of the battery. For example, the charge predictor 106 can predict a difference between the state of charge of the battery and the desired state charge of the battery. For example, if an electric vehicle is on a route towards a home where the electric vehicle can be recharged with 100% renewable energy, the desired energy can be an amount of energy to allow the electric vehicle to reach the home. The charge predictor 106 can determine this amount according to a travel time, speed, or environment along a selected route. For example, if an electric vehicle is 200 miles from a home, and a battery pack has a state of charge of 80 kWh, the charge predictor 106 can predict a request to charge an additional 20 kWh, if the vehicle is presumed to travel 2 miles per kWh (e.g., according to a detected driver, temperature, traffic density, and other variables).

The charge predictor 106 can consider the charging efficiency of the battery and of the charging station 178. For example, if a battery system 156 charges at an efficiency of 90%, and the battery state of charge should be increased by 20 kWh, the charge predictor 106 can predict an amount of electricity to charge the battery to be about 22.2 kWh. The charge predictor can determine a desired state of charge of the battery which can be a fully charged battery, or can be less than a full charged battery. For example, the amount of energy can vary based on a route of the electric vehicle. The electric vehicle can be associated with a route requiring two stops and a total charging of 120% of the battery capacity of the vehicle. The charge predictor 106 can determine a desired state of charge at a first charging station 178 based at least in part on the energy composition of the selected charging station 178. For example, if the first charging station 178 sources a greater portion of energy from renewable energy sources, the charge predictor 106 can determine a desired charge to be to 100% for the first charger, and 20% for the second charger. The charge predictor 106 can reconcile one or more charging estimates with a measurement of an amount charged. For example, the charge predictor 106 can estimate a first total charge amount, and a first non-renewable charge amount. The first total charge amount, and first non-renewable charge amount can be reconciled by comparing or adjusting the prediction to the measured amount. For example, the charge predictor 106 can predict a total charge of 50 kWh, and an actual charge can be completed of 45 kWh. The reconciliation can update at least one element of the energy source balancer 102 of the actual energy use.

The energy source balancer 102 can include an emissions forecaster 110 to determine an amount of carbon emissions associated with a charging session. The emissions forecaster 110 can determine the carbon emissions associated with a current charging session (e.g., in real time), a historic charging session (e.g., a charging session that occurred in the past 24 hours, 48 hours, week, month, or other time interval), or predict the carbon emissions associated with a future charging session (e.g., a charging session that may occur in 24 hours, 48 hours, 1 week, 1 month, or other time interval). The emissions forecaster 110 can forecast emissions based on historical trends which can be determined or received from historical grid composition 182. The trends can be adjusted or selected based on forecast parameters 186. For example, the emissions forecaster 110 can estimate an energy grid composition based on weather or traffic conditions. The emissions forecaster 110 can consider scheduled maintenance associated with one or more fossil fuel-based power plants 172 or renewable resource based power plants 174. For example, if a coal-fired plant is disengaged for maintenance, the emissions forecaster can predict a gas peaker plant can be engaged, or that a portion of the grid can be supplied from grid storage 176. The emissions forecaster can associate one or more energy sources with an emissions amount based on the energy type or specific information related to the energy plant. The energy composition contribution of the grid storage 176 can be based on historical grid composition 182, such as during a time of charging the grid storage 176.

The emissions forecaster 110 can access an API of an energy grid operator (e.g., an operator of the energy grid system 170) or a third party aggregator to obtain information used to forecast the amount of carbon emissions associated with a historical, current, or future charging session for an electric vehicle. For example, the emissions forecaster 110 can access historical grid composition 182, real time grid composition 184, or forecast parameters 186. The emissions forecaster 110 can predict a portion of renewable resources or an amount of emissions based on the accessed information. The emissions forecaster 110 can access predictions from the energy grid operator or a third party aggregator. For example, the emissions forecaster 110 can receive one or more predications of future energy grid composition or emissions. The emissions forecaster 110 can select or refine the predictions based on available information and user preferences 116. For example, the emissions forecaster 110 can receive a user preference 116 to prioritize energy source relative to route time (e.g., according to a weighted user preference 116). The emissions forecaster 110 can determine an arrival time to the charging station based on the user preference 116. The emissions forecaster 110 can provide (e.g., over the API) the arrival time, location, or amount of planned charge of one or more electric vehicles, which can further refine the prediction models.

The emissions forecaster 110 can be configured with a model trained using machine learning applied to historical charging session information and historical carbon emissions information. The training data used to the train the model can be obtained from the operator of the energy grid system 170, the data repository 180, or a third-party aggregator. The model can be trained with information associated with a particular charger, geographic location, energy grid system 170, temperature, seasonality, or other information that can facilitate the emissions forecaster 110 to determine, predict, estimate, or otherwise identify an amount of carbon emissions associated with a charging session.

The energy source balancer 102 can include at least one action generator 108 to generate an action to offset a difference between the amount of electricity to charge the battery and the portion of the amount of electricity provided via the one or more renewable energy sources in the time interval. For example, the amount of electricity used to charge the battery may have been generated from multiple energy sources on in the energy grid system 170, such as a fossil fuel-based power plant 172 and a renewable resource-based power plant 174. The energy source balancer 102 can determine the portion of the amount of electricity generated from the renewable resource-based power plant 174. The energy source balancer 102 can determine the portion of the amount of electricity generated from the fossil fuel-based power plant 172. In this example, the difference between the amount of electricity to charge the battery and the amount of the amount of electricity provided via the one or more renewable energy sources in the time interval can refer to the amount of energy provided by the fossil fuel-based power plant 172.

The energy source balancer 102 can generate the action to include a power demand adjustment (e.g., demand reduction) such as an adjustment to the operation of the electrical vehicle. For example, the action generator 108 can initiate a vehicle speed adjustment such as a decrease in highway speed, or a climate control setting such as a use of heated seats rather a passenger cabin heater. The action generator 108 can include a selection of a charger or charging time. For example, reaching a charger at a later or earlier time can result in a power demand adjustment, or selecting a lower charging time can lower the difference between the amount of electricity to charge the battery and the portion of the amount of electricity provided via the one or more renewable energy sources. The action generator 108 can cause a battery to be charged to a higher percent (e.g., 100%) than during normal operation at a first, 100% renewable charger to minimize a charge at second, 50% renewable charger, and charge a lower percent at the 50% renewable charger. For example, the action generator 108 can interface directly with the electric vehicle or the charging station 178, can prompt a user to accept a proposed action, or can request the user perform an action.

The action generator 108 can generate an action of applying RECs. For example, the action can be or include using a charging station 178 which overprovisions RECs. Overprovisioning an REC can refer to or include a charging station 178 that offsets a greater portion of the energy received than is sources from renewable energy. For example, a charging station 178 that receives 50% of its energy from renewable resource-based power plants 174, and offsets 100% of energy used can overprovision RECs by 50%. The action generator 108 can determine a number of offsetting RECs for an energy grid during the charging interval, and compare the number of offsetting RECs to a greater number of actual RECs associated with the charger. The action generator can obtain RECs such as by providing negative wattage demand (negawatts). For example, a battery system can accumulate RECs by alternatively sourcing a reception of energy by the battery (e.g., charging the battery) from a grid at a time when the energy grid includes a relatively high proportion of renewable energy, and discharging the battery into the energy grid when the energy grid includes a relatively low proportion of renewable energy. For example, the action generator 108 can perform the action in response to a previous authorization by a user (e.g., a user preference 116), or by a prompt to the user to provide the energy. Energy credits can also be purchased. For example, the action generator can prompt the user to execute a transaction to make a purchase of RECs, or maintain a ledger of offsetting REC's to make purchases at regular intervals. The action generator can generate a demand reduction such as by causing a speed of the electrical vehicle to decrease, or adjusting a climate control setting (e.g., by displaying a prompt to take the action on an interface of the electric vehicle).

The electric vehicle energy system 152 can include at least one vehicle interface 154. The electric vehicle energy system 152 can include at least one battery system 156. The electric vehicle energy system 152 can include at least one data repository 160.

The electric vehicle energy system 152 can include at least one vehicle interface 154. The vehicle interface 154 can be or include a graphical user interface and a network connection to at least the energy source balancer. For example, the vehicle interface 154 can be or include a mobile device associated with the electric vehicle or a center information display (CID) of the electric vehicle which is communicatively coupled to a modem. The vehicle interface 154 can receive an indication from a user associated with the electric vehicle to charge a battery of the electric vehicle. Responsive to the receipt of the indication, the vehicle interface 154 can display a plurality of charging stations 178 along with energy grid compositions or energy intensities thereof. For example, the vehicle interface 154 can cause the energy source balancer 102 to determine information associated with various charging stations 178, and communicate the information to the vehicle interface 154.

The vehicle interface 154 can display the charging stations 178 with a greater portion of renewable energy with elevated prominence. For example, the vehicle interface 154 can depict a plurality of charging stations 178 in a map view wherein some charging stations can be bolded, starred, or shown with a green ring to denote a renewable option. The charging stations 178 selected for elevated prominence can be based on a minimum threshold of renewable energy supplied to the charger 178, or a maximum amount of an offset for the charger. The thresholds can be dynamic (e.g., automatically varied according to chargers 178 available in a region or according to a user preference 116), or fixed. The charging stations 178 selected for elevated prominence can be based on additional criteria. For example, a charging station 178 can be displayed based on a distance or affiliation.

The vehicle interface can infer the indication to charge the electric vehicle based on a route. For example, a 1,000 mile route selected for an electric vehicle with a 400 mile range, can provide an indication to charge the electric vehicle at least to complete the route. The vehicle interface 154 can include a routing function to locate charging stations 178 along a route of an electric vehicle or within a vicinity of the electric vehicle. The route or destination can be received by the vehicle interface 154. For example, the route or destination can be entered by a user on a mobile device associated with the user, or the (CID) of the electric vehicle. The vehicle interface 154 can receive a route from a destination by determining the route by the electric vehicle or another resource, such as a service accessible to the electric vehicle over the network 150 (e.g., by a route determination module. The route can depend on various user preferences 116. The distance can be based on an overall energy use (or overall carbon emissions), or based on a user preference 116 (e.g., for a shortest duration).

The electric vehicle energy system 152 can include at least one battery system 156. The battery system 156 can include a battery and circuits to charge the battery, determine a state of charge of the battery, determine a capacity of the battery, or determine a charging speed of the battery. The battery can include a plurality of cells, cell balancing hardware, or a sensor suite reporting on the status of the battery and associated components. The battery can store energy, and the operations of the battery pack can be configured (e.g., in response to a user preference or another communication). For example, a maximum and minimum charge state can be established which can be relevant to the wear of the cells of the battery or of other components. The battery cells can include a thermal management system including a thermal management device. The battery can be, include, or be subdivided into modules or submodules which can include or be associated with battery cells and thermal management systems. Each battery, module, or submodule can include a plurality of cells such as prismatic, cylindrical, rectangular, square, cubic, flat, or pouch form factor cells.

The data repository 160 can include one or more local or distributed databases, and can include a database management system. The data repository 160 can include computer data storage or memory and can store one or more of a local user preferences 162, location data 164, or a battery data 168. The local user preferences 162 can include user preferences 116 stored or accessibly by the electric vehicle energy system 152 such as a battery charge target. The location data 164 can include a location associated with the electric vehicle such as a location of the electric vehicle or a location along a route associated with the electric vehicle. The battery data 168 can include battery state information such as temperature and state of charge.

The local user preferences 162 can include a typical and maximum or minimum charge states of the battery of an electric vehicle, (e.g., 80% typical and 95% maximum). For example a local user preference 162 can include a charging efficiency preference, or a charging time threshold (e.g., the preference can result in the exclusion of low speed, low voltage charging because of efficiency and time thresholds or weights). The local user preferences 162 can include routing preferences, such as a routing selection which is optimized for time or for renewable energy use (or various weighted settings therebetween). The local user preferences 162 can include preferences for a use of charging stations 178 having renewable energy over charging stations 178 applying renewable energy offsets, or other preferences concerning renewable resource-based power plants 174 (e.g., a preference for solar relative to nuclear, or hydroelectric over wind). User preferences associated with the energy source balancer 102 can be stored as local user preferences 162 and conveyed to the energy source balancer 102. For example, a user can prefer to accumulate information for an action to be taken at a regular interval such as monthly, quarterly or annually, and can be stored as a local user preference 162 or conveyed to the energy source balancer 102.

Figure 2:
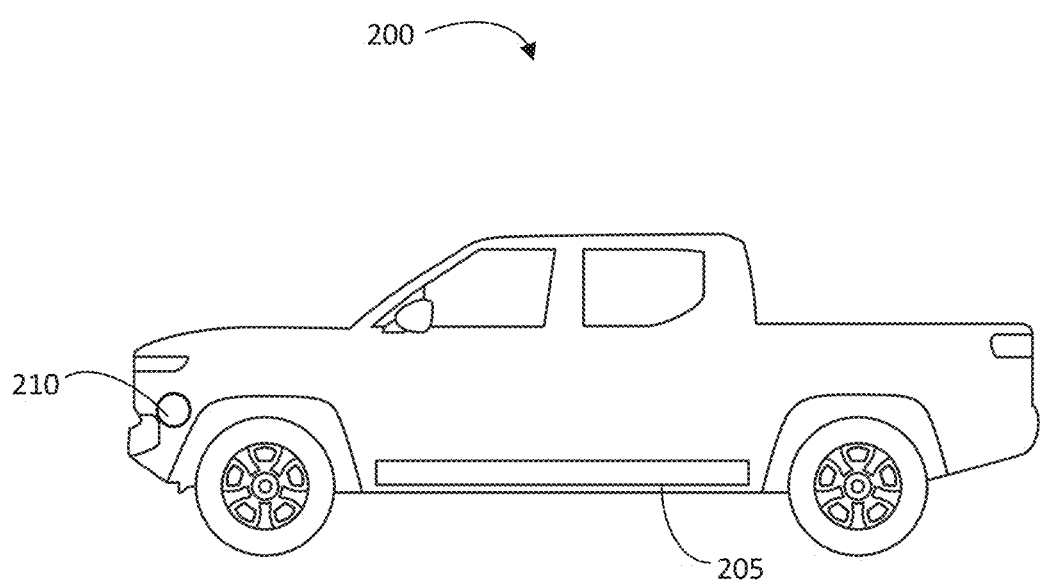
FIG. 2 is an electric vehicle, in accordance with some aspects.

FIG. 2 is an electric vehicle 200, in accordance with some aspects. The electric vehicle can include a battery pack 205. For example, the battery pack 205 can be or include one or more components of the battery system 156. One or more local user preferences 162 or can affect the behavior of the battery pack 205. For example, the battery pack can have a preferred charging rate or capacity. The rate or capacity can be varied according to energy use. For example, a preferred energy charge rate can be selected to maximize charging efficiency. A faster (or slower) charging speed can increase a portion of electricity supplied to the battery pack from renewable energy sources. For example, a faster charging speed can charge the vehicle prior to a sunset, a subsidence of wind, or another parameter associated with renewable energy production. Other parameters can affect the operation of the battery pack. For example, a temperature can affect a charging speed or efficiency of the battery pack. For example, at low temperatures, a battery pack 205 can be heated for charging, which can lower an efficiency relative to warmer temperatures (e.g., ambient temperatures or cell temperatures).

The battery pack can include or interface with one or more user preferences 116. For example, a user preference 116 can indicate a choice to charge at home, or charge away from home. A user preference 116 can indicate a choice to maintain the battery within range of states of charge. For example, the user preference 116 indicate a preference to keep the battery between 20% and 80% state of charge. The range can be dynamic based on a time in range. For example, a user preference 116 can indicate a preference to maintain the battery of the electric vehicle in the range during nonoperation but permit excursions from the range during operation. For example, during or in advance of a trip, a charge of 90% or 100% can be preferred. For example, an increased charge for a trip can decrease carbon emissions, and reduce recharging time, such as when charging at home is based on renewable energy and charging during travel is variable, based on the state of one or more energy grids.

The electric vehicle 200 includes a charging circuit to interface the battery pack to a charging station 178. The charging port 210 can interface, selectively, with one or more charging stations 178. For example, a charging station 178 can be selected based on a physical connection standard, a membership or other affiliation, or an option to user a charger 178 without prior enrollment. The charging circuit and the charging station 178 can control the recharge rate, and total amount of the charge.

Figure 3:
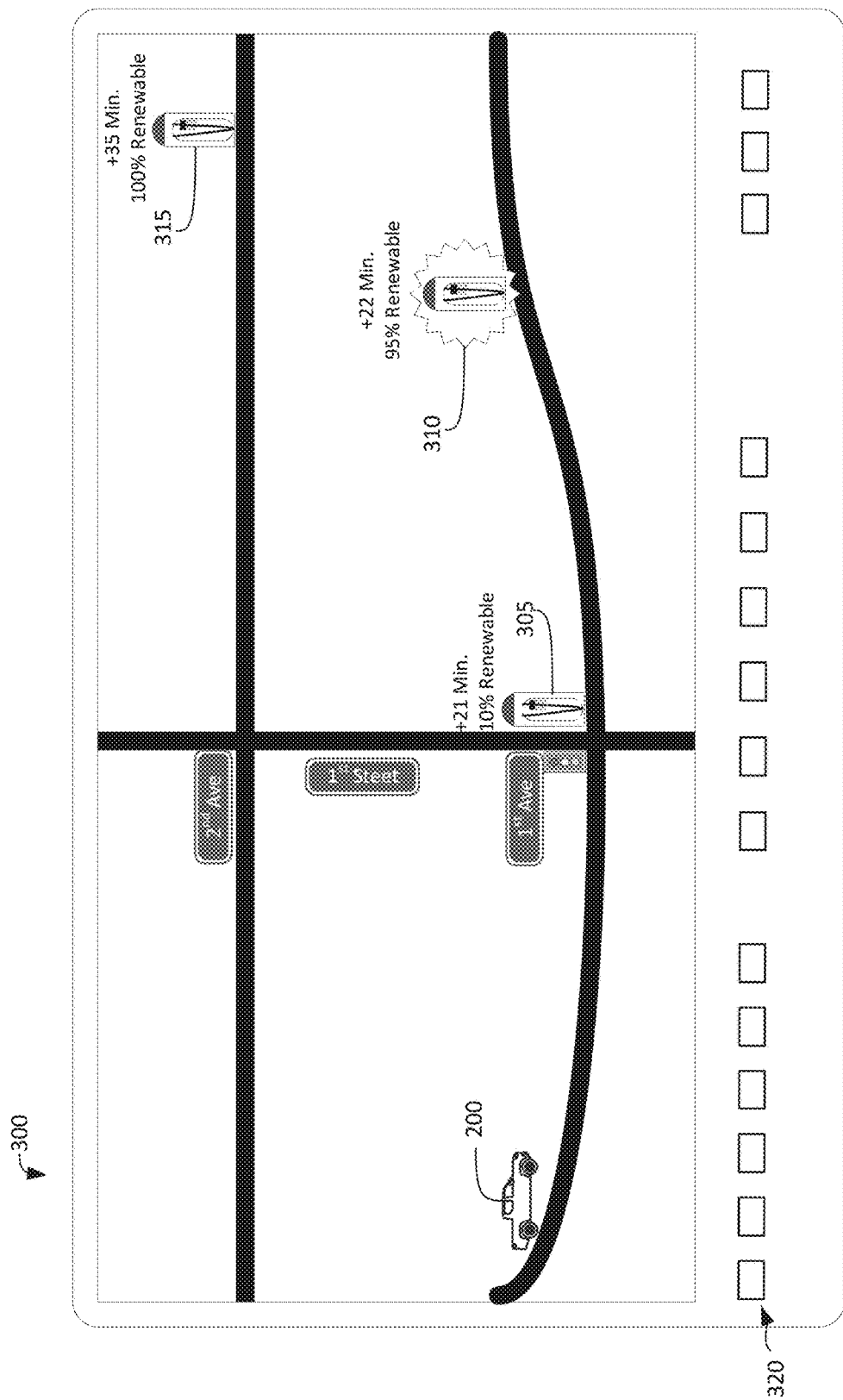
FIG. 3 is a graphical user interface, in accordance with some aspects.

FIG. 3 depicts a graphical user interface (GUI) 300, in accordance with some aspects. The GUI 300 can include one or more user inputs 320 such as audio, buttons, or wireless transceivers. The user inputs 320 can receive various selections, entries, responses, or requests from a user of the electric vehicle. The GUI can include one or more outputs such as audible outputs, display screens, or LEDs. The GUI 300 can be associated with one or more electric vehicles 200. For example, the GUI 300 can be a center information display (CID) or other display of the electric vehicle 200, or a mobile device associated with the electric vehicle 200, such as a mobile device having a mobile application installed thereupon containing application data linking the mobile device to a unique identifier of the electric vehicle 200.

The GUI 300 can display a location of the electric vehicle 200 relative to one or more roads, paths, or trails. The GUI 300 can include route information for the electric vehicle 200. For example, the route information can be responsive to the state of the electric vehicle 200 or a state of the route. For example, a route can be selected based on a state of charge, a grid composition (e.g., a real time grid composition 184), or a traffic speed along the route. The user can indicate, such as by a selection on the GUI 300 or an associated button, or based on a state of charge of the battery pack 205 (e.g., according to a user preference 116), that the battery should be charged.

The GUI 300 can display one or more charging station locations along a route or associated with the route. For example, the GUI 300 can display a plurality of routes having charging stations 178 disposed there-along. The display can be automatic or responsive to the indication from the user. The GUI 300 can include information for one or more of the charging stations 178 or a predicted charge from the charging station 178. For example, the GUI 300 can include a carbon intensity of a charge, a renewable portion of a charge, a cost of a charge (e.g., with or without any offsets), a time of a charge, or a time a charge can add to a total trip time. Some chargers 178 associated with a route can be disposed away from the route. The display of information can be adjusted to indicate the additional travel distance to reach the charger (e.g., the cost, portion of renewable energy, carbon intensity, etc.). For example, The GUI can display a charger associated with 90% renewable energy, but requiring a number of miles to drive to be doubled as being associated with 80% renewable energy to normalize the non-renewable energy use between the displayed chargers 178.

Charging stations 178 can be depicted based on information associated therewith. For example, a first charging station location 305 can be shown at a first level of prominence because the first charging station location 305 extends the trip time of the vehicle by a shortest amount. A second charging station location 310 can be shown with a second, elevated prominence based on the combination of high renewable energy content and low increment to trip time. A third charging station location 315 can be depicted at a first level of prominence based on the highest portion of renewable energy content. Additional energy stations can be present, but not displayed, or displayed with another prominence. The GUI 300 can select a prominence for non-display based on the criteria to determine the prominence of the first charging station location 305, second charging station location 310, and third charging station location 315. For example, a score exceeding a first threshold can cause the charging station locations to be displayed at a first level of prominence. A score exceeding a second threshold can cause the charging station to be displayed at the second level of prominence. According to various aspects, charging stations can be selected according to fixed or variable criteria. For example, a user preference 116 such as a local user preference 162 can determine a prominence of display for a charging station. The user preference 116 can specify criteria, priorities, and weights. For example, the user preferences 116 can include a weight for each of trip time, renewable portion, cost, and total carbon intensity.

The GUI 300 can depict one or more charging stations 178 in a map view without reference to a route. For example, the GUI 300 can depict charging stations 178 within a distance of the electric vehicle 200 or another distance defined by the GUI 300 (e.g., a distance specified by a local user preference 162 or by a user selection of a map area of interest). For example, the user can manipulate (e.g., scroll or zoom) the graphical user interface whereupon one or more charging stations can be displayed.

The GUI can depict one or more charging stations 178 in a list. For example, a list can be displayed visually or audibly. The list can include a depiction or a sorting of the charging station location according to one or more of the criteria used to determinate a prominence or display of the electric vehicle on a map view. For example, the charging stations 178 can be ranked according to a portion of renewable energy or a carbon intensity. The rank can generate a sorted list of chargers 178 which can be presented by the GUI 300 based on the sort order or a comparison to one or more thresholds. For example, a first (e.g., selected charger 178) can have a highest portion of renewable energy or a lowest carbon intensity. For example, a greater percent of the renewable energy can be sources from renewable energy sources among a relevant set of chargers (e.g., chargers along a route or in proximity to an electric vehicle).

Figure 4:
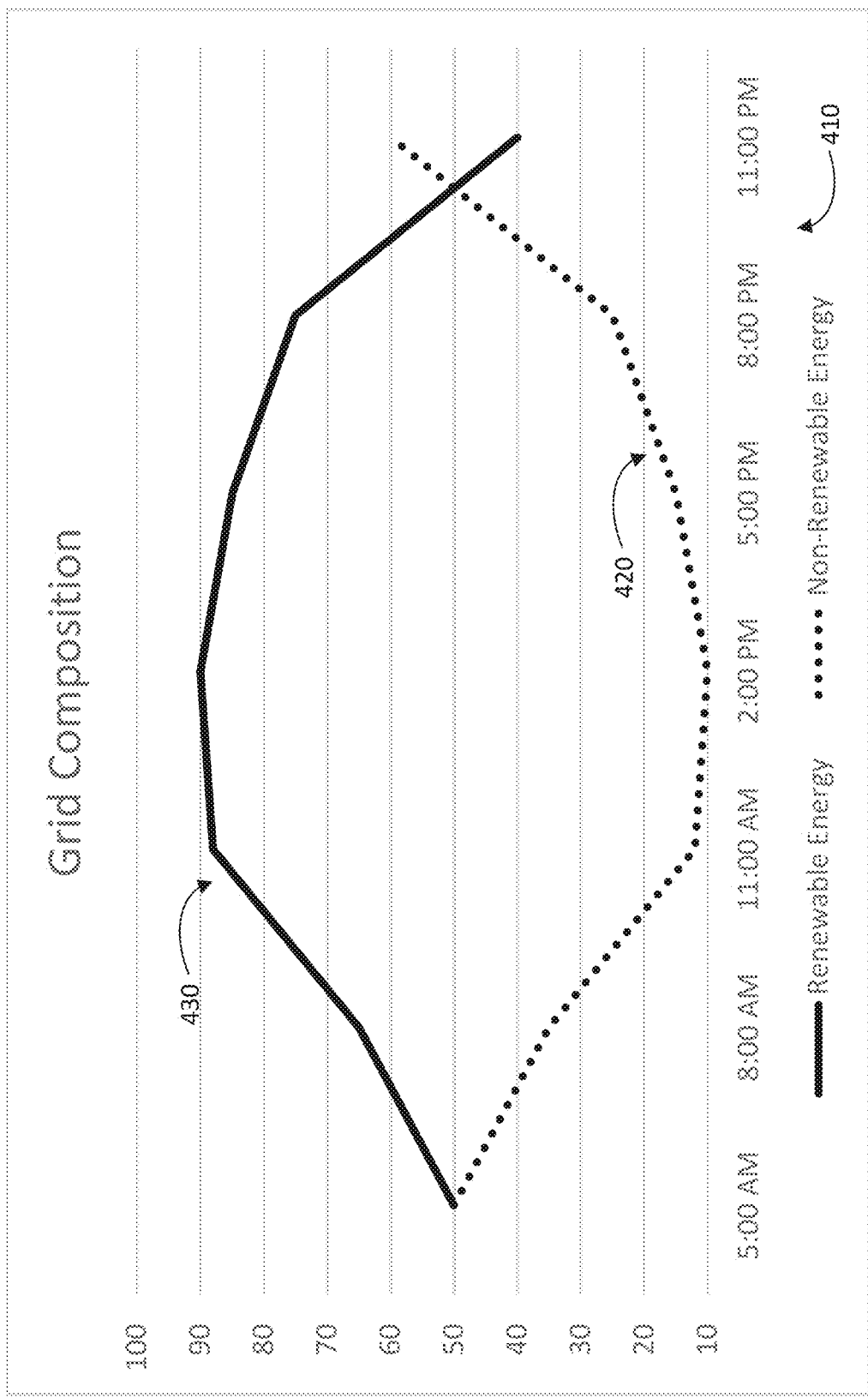
FIG. 4 illustrates the energy composition of an energy grid over time, in accordance with some aspects.

FIG. 4 illustrates the energy composition of an energy grid over time, in accordance with some aspects. The charge predictor 106 can record the energy composition of the grid over various discrete time segments 410. The charge predictor 106 can define discrete time segments 410 as hourly, semi-hourly, minutely, or another discrete time segments 410. The charge predictor 106 can define the discrete time segments 410 based on a processing or data capability of a system or device such as the energy source balancer 102. For example, the charge predictor 106 can base the discrete time segments 410 on data selection practices, or the data available (e.g., available over an API from a grid operator or an aggregator of grid operators). The charge predictor 106 can associate each discrete time segment 410 with a non-renewable energy portion 420 and a renewable energy portion 430. The charge predictor 106 can include additional information in a grid composition, such as a detail of energy sources which can be of interest to a user (e.g., a user can prefer to avoid a renewable energy source such as wind or nuclear, due to bird strikes or waste disposal concerns). Additional parameters can enable discrimination, by the charge predictor 106 or other elements of the energy source balancer 102 between power sources. For example, the action generator can discriminate between a grid use of a coal fired plant and a natural gas plant based on a carbon intensity.

The depicted grid composition can be a historical grid composition 182, or can include forecast grid data. For example, the emission forecaster 110 can forecast grid demand. For example, the emissions forecaster 110 can evaluate a seasonality, time of day, temperature, day of week, or major events to forecast weather or energy demand or supply. The emissions forecaster can depend on forecast grid supply. For example, the emissions forecaster 110 can evaluate planned maintenance of any power plants, a state of grid storage 176, and an expected contribution from variable sources. Some renewable resource-based power plants 174 can have varying but predictable outcomes. For example, the emissions forecaster 110 can predict solar power based on expected sunniness or cloudiness, or wind power based on an expected windiness or stillness. The emissions forecaster 110 can reconcile a measured condition with a predicted condition. For example, the reconciliation can improve future predictions, or update other elements of the energy balancing system 102 such as an action generator 108 (e.g., to offset a larger or smaller portion of the energy supplied to a battery of an electric vehicle).

Figure 5:
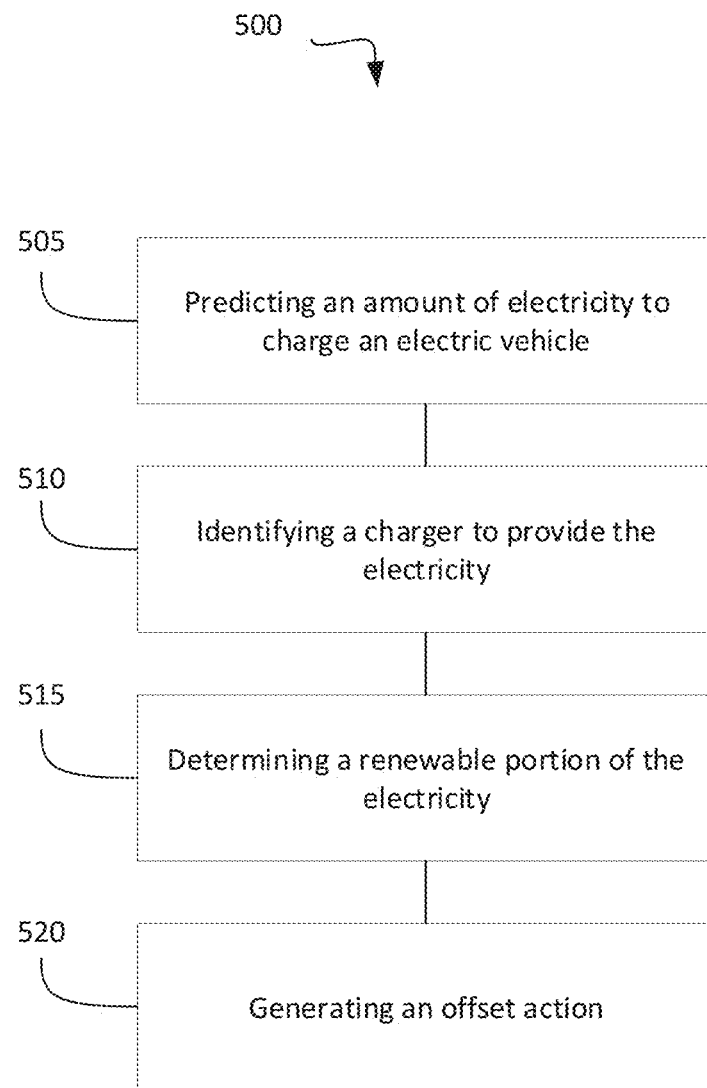
FIG. 5 is a flow diagram of a method to balance energy sources, in accordance with some aspects.

FIG. 5 is a flow diagram of a method 500 to balance energy sources, in accordance with some aspects. The method 500 can be performed by one or more components or systems depicted in FIG. 1-3 or 7, including, for example, an energy source balancer 102. In brief summary, at ACT 505, the energy source balancer 102 can predict an amount of electricity to charge a vehicle. At ACT 510, the energy source balancer 102 can identify a charger 178. At ACT 515, the energy source balancer 102 can determine a portion of the electricity generated from renewable resources. At ACT 520, the energy source balancer 102 can generate an action to offset at least some of the non-renewable portion.

At ACT 505, the energy source balancer 102 can predict an amount of electricity to charge an electric vehicle 200. The amount of electricity to charge the battery can depend on a current state of charge of a battery pack 205 of the electric vehicle 200, as well as a location of the electric vehicle 200. For example the energy source balancer 102 can determine a current state of charge of the battery pack 205 and compare the current state of charge to the maximum state of charge to determine an amount of energy. The amount of energy can include the amount of energy delivered to the battery pack 205 or any transmission power, auxiliary power (e.g., to condition the battery during or prior to charging), or charging station 178 power use. The energy source balancer 102 can receive an indication that the battery pack 205 will not be charged to a maximum capacity. For example, a user preference 116 can indicate a lower capacity, or a route associated with the electric vehicle 200 can be navigable with a lesser charge.

At ACT 510, the energy source balancer 102 can identify a charger 178. The charger 178 can be identified based on a proximity to the electric vehicle 200, a proximity to the route of the electric vehicle 200, or a composition of an energy grid or offset associated with the charger 178. For example, the energy source balancer 102 can determine an approximate location for a charger 178 based on the state (e.g., position and state of charge) of the electric vehicle 200. The energy source balancer 102 can access information related to a plurality of chargers 178. For example, the information can be related to a type, or operator of the charger, and can include a compatibility with the charging port 210 of the electric vehicle. One or more chargers 178 can be identified. For example, the energy source balancer 102 can cause one or more chargers 178 and directions for travel thereto to be displayed by the GUI 300.

At ACT 515, the energy source balancer 102 can determine a portion of the electricity generated from renewable resources. The charger 178 can apply any renewable energy sourcing or renewable energy offsets known to be associated with the charger 178. The energy source balancer 102 can access information related to the energy grid at the one or more chargers 178. For example, the energy source balancer 102 can access predictions of energy grid composition at the time the electric vehicle 200 is expected at the charger 178, or access forecast parameters 186 and predict the future composition of the energy grid. The predication can be based on (e.g., can be) the real time grid composition 184. For example, if the electric vehicle 200 is approaching a charger 178 within a same discrete time segment 410 the vehicle is predicted to charge in, the last available recordation or estimate of real time grid composition 184 can be a forecasted grid composition.

At ACT 520, the energy source balancer 102 can generate an action to offset some or all of the non-renewable portion of energy consumed during the charging session. Some offset portions can be time averaged or a ledger of actions can be generated. For example, an action can include charging the electric vehicle at a first charging station overprovisioning offsets following (or prior to) charging at a second charging station (or the first charging station at a second time) which under-provisions offsets. The action can be taken contemporaneously with charging. For example, the selection of an alternate route, or another vehicle demand adjustment can be elected at a time of charging. For example, the CID, another display of the electric vehicle the mobile device associated with the vehicle can prompt the user to take the action.

The amount of energy delivered to a battery, the composition of the electric grid, user, preferences, or a route can change between a time of prediction and the charging of the battery. The amount of electricity delivered to the vehicle or the composition of the grid can be reported to a user following the charging of the electric vehicle 200, or the action can be generated in response to the completion of the charging. For example, a user can select a charger 178 (which may or may not be based on a reception of energy to charge the battery or a composition of the energy grid associated with the charger 178) and the energy source balancer 102 can thereafter provide the user with an action to offset the non-renewable energy of the charger. For example, if the user maintains an REC ledger of over and under provisioned RECs, the user can be prompted to select one or more actions, which can include reducing a current REC ledger (e.g., from previous over-provisioned charges). In some implementations, an REC ledger is not maintained, or if a number of stored RECs are insufficient for the charge. The user can be prompted to execute a transaction for (e.g., purchase) an offsetting REC credit as a portion of the action or as the action. Additional variations based on this disclosure can be performed as a part of method 500. Indeed, ACTs can be added (or substituted/omitted) which are not explicitly defined in the method 500, based on the disclosure provided herein. For example, at least some of the various ACTs provided herein can be performed by a data processing system of the electric vehicle 200, or the charger 178.

Figure 6:
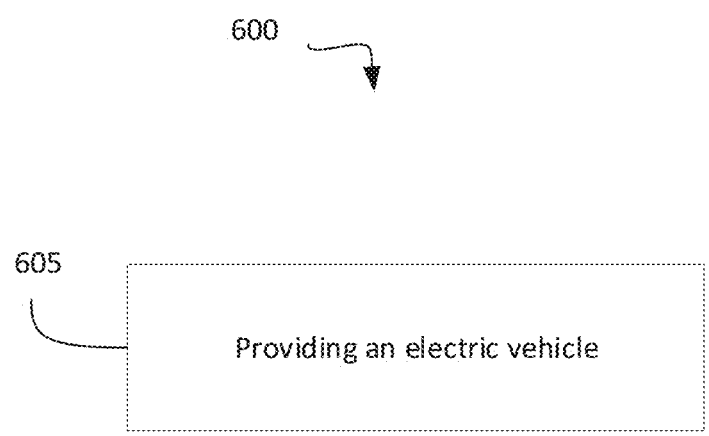
FIG. 6 is a flow diagram of a method to provide an electric vehicle, in accordance with some aspects.

FIG. 6 is a flow diagram of a method 600 to provide an electric vehicle 200 (ACT 605), in accordance with some aspects. The electric vehicle 200 can be provided to a user or connected to an energy source balancer 102. For example, the electric vehicle can interface with the energy source balancer 102, a charger 178, or another electric vehicle.

Figure 7:
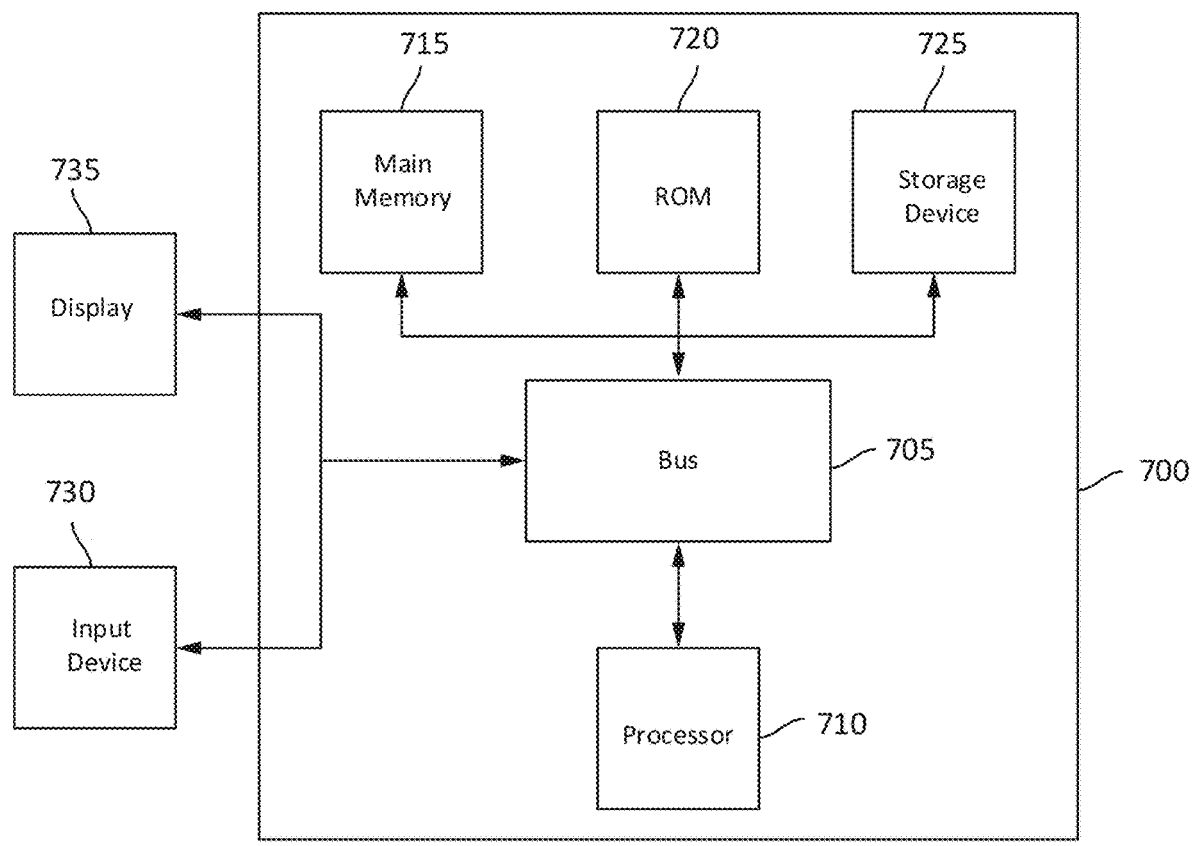
FIG. 7 is a block diagram illustrating an architecture for a computer system that can be employed to implement elements of the systems and methods described and illustrated herein.

FIG. 7 depicts an example block diagram of an example computer system 700. The computer system or computing device 700 can include or be used to implement one or more components of a data processing system, energy source balancer, or electric vehicle energy system. The computing system 700 includes at least one bus 705 or other communication component for communicating information and at least one processor 710 or processing circuit coupled to the bus 705 for processing information. The computing system 700 can also include one or more processors 710 or processing circuits coupled to the bus for processing information. The computing system 700 also includes at least one main memory 715, such as a random access memory (RAM) or other dynamic storage device, coupled to the bus 705 for storing information, and instructions to be executed by the processor 710. The main memory 715 can be used for storing information during execution of instructions by the processor 710. The computing system 700 may further include at least one read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions.

The computing system 700 may be coupled via the bus 705 to a display 735, such as a liquid crystal display, or active matrix display, for displaying information to a user such as a driver of the electric vehicle or other end user. An input device 730, such as a keyboard or voice interface may be coupled to the bus 705 for communicating information and commands to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation.

Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of" 'A' and 'B' can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, charging and discharging may be inverted. Elements described as negative elements can instead be configured as positive elements and elements described as positive elements can instead by configured as negative elements. For example, an amount of electricity a battery can provide can be determined instead of the amount of electricity the battery can be provided, or a predicted and measured energy portion can be substituted (e.g., an offset can be based on a predicted or measured value). Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   one or more processors, coupled with memory, to:
   predict, based at least in part on a state of charge of a battery of an electric vehicle, an amount of electricity to charge the battery of the electric vehicle in a time interval;

identify a charger connected to an electricity grid configured to provide the amount of electricity to charge the battery;

determine, based on an identity of the charger, a first quantity of renewable energy credits, each renewable energy credit representing a predefined amount of electricity, acquired incident to the amount of electricity obtained in the time interval;

determine a second quantity of the amount of electricity obtained in the time interval from one or more renewable energy sources of the electricity grid;

determine a first portion of the amount of electricity provided to the charger in the time interval, the first portion comprising the first quantity and the second quantity;

determine a second portion of the amount of electricity provided to the charger in the time interval via one or more non-renewable energy sources of the electricity grid, wherein the second portion corresponds to a difference between the amount of electricity and the first portion; and generate, subsequent to the time interval, based at least in part on the second portion that corresponds to the difference between the amount of electricity provided to the charger in the time interval and the first portion of the amount of electricity provided via one or more renewable energy sources, an action configured to offset the second portion.

2. The system of claim 1, wherein the amount of electricity to charge the battery is based on a route established for the electric vehicle to travel.

3. The system of claim 1, wherein the time interval is less than an amount of time taken to charge the battery to full capacity.

4. The system of claim 1, wherein the charger is identified based at least in part on a first distance from the charger to the electric vehicle or a second distance from the charger to a location on a route of the electric vehicle.

5. The system of claim 1, comprising the one or more processors to:
select the charger with a highest portion of the amount of electricity provided via the one or more renewable energy sources in the time interval; and
present the selected charger via a graphical user interface.

6. The system of claim 1, comprising the one or more processors to:
rank the charger and a plurality of additional chargers by the second portion; and
display, via a graphical user interface, the charger and the plurality of additional chargers;
wherein the charger and the plurality of additional chargers of a higher rank are displayed with elevated prominence.

7. The system of claim 1, wherein the action comprises:
a determination of a difference between a portion of renewable energy of a grid at a first time and a second time;
a determination of a second amount of energy to offset the second portion of the amount of electricity provided to the charger, the determination of the second amount of energy based on the difference;
a reception of the second amount of energy from the electricity grid at the first time; and
a provision of the second amount of energy to the electricity grid at the second time;
wherein a composition of the electricity grid includes a greater portion of renewable energy at the second time than the first time.

8. The system of claim 1, wherein the action comprises a selection of a charging time or an additional charger.

9. The system of claim 1, wherein the action comprises an execution of a transaction for a second quantity of renewable energy credits.

10. The system of claim 1, wherein the action comprises:
a determination of a demand reduction of the electric vehicle equal to the second portion, the demand reduction comprising a vehicle speed adjustment, a climate control setting, or a battery charge level; and
an initiation of the determined demand reduction.

11. A method, comprising:
predicting, by a data processing system comprising one or more processors coupled with memory, based at least in part on a state of charge of a battery of an electric vehicle, an amount of electricity to charge the battery of the electric vehicle in a time interval;

identifying, by the data processing system, a charger connected to an electricity grid configured to provide the amount of electricity to charge the battery;

determining, based on an identity of the charger and by the data processing system, a first quantity of renewable energy credits, each renewable energy credit representing a predefined amount of electricity, acquired incident to the amount of electricity obtained in the time interval;

determining a second quantity of the amount of electricity obtained in the time interval from one or more renewable energy sources of the electricity grid;

determining, by the data processing system and for the charger, a first portion of the amount of electricity provided to the charger in the time interval, the first portion comprising the first quantity and the second quantity;

determining a second portion of the amount of electricity provided to the charger in the time interval via one or more non-renewable energy sources of the electricity grid, wherein the second portion corresponds to a difference between the amount electricity and the first portion; and generating, by the data processing system and subsequent to the time interval, based at least in part on the second portion that corresponds to the difference between the amount electricity provided to the charger in the time interval and the first portion of the amount electricity provided via one or more renewable energy sources, an action configured to offset the second portion.

12. The method of claim 11, comprising:
ranking, by the data processing system, the charger and a plurality of additional chargers by the second portion; and
displaying, via a graphical user interface, the charger and the plurality of additional chargers;
wherein the charger and the plurality of additional chargers having a higher rank are displayed with elevated prominence.

13. The method of claim 11, comprising:
displaying, by the data processing system via a graphical user interface, the charger, and a predicted composition of the one or more renewable energy sources of the electricity grid.

14. The method of claim 11, comprising:
receiving, by the data processing system, a measured amount of electricity delivered to charge the battery of the electric vehicle; and
reconciling, by the data processing system, the measured amount of electricity to the predicted amount of electricity to charge the battery.

15. The method of claim 11, wherein the action comprises:
determining a demand reduction of the electric vehicle equal to the second portion, the demand reduction comprising adjusting a vehicle speed, a climate control setting, or a battery charge level; and
initiating the determined demand reduction.

16. The method of claim 11, wherein the action comprises conducting a transaction for a second quantity of renewable energy credits.

17. An electric vehicle, comprising: one or more processors, coupled with memory, to:
receive, via a graphical user interface, an indication from a user of the electric vehicle to charge a battery of the electric vehicle;
determine, responsive to the indication from the user, an amount of electricity to charge the battery of the electric vehicle in a time interval;
identify a charger connected to an electricity grid configured to provide the amount of electricity to charge the battery;
determine, based on an identity of the charger, a first quantity of renewable energy credits, each renewable energy credit representing a predefined amount of electricity, acquired incident to the amount of electricity obtained in the time interval;
determine a second quantity of the amount of electricity obtained in the time interval from one or more renewable energy sources of the electricity grid;
determine, for the charger, a first portion of the amount of electricity provided to the charger in the time interval, the first portion comprising the first quantity and the second quantity;
determine a second portion of the amount of electricity provided to the charger in the time interval via one or more non-renewable energy sources of the electricity grid, wherein the second portion corresponds to a difference between the amount electricity and the first portion; and
provide, subsequent to the time interval, based at least in part on the second portion that corresponds to the difference between the amount electricity provided to the charger in the time interval and the first portion of the amount electricity provided via one or more renewable energy sources, via the graphical user interface, an indication of an action configured to offset the second portion.

18. The electric vehicle of claim 17, comprising the electric vehicle to:
rank the charger and a plurality of additional chargers by the second portion; and
display, via the graphical user interface, the charger and the plurality of additional chargers;
wherein the charger and the plurality of additional chargers of a higher rank are displayed with elevated prominence.

19. The electric vehicle of claim 17, wherein the action comprises a demand reduction of the electric vehicle, the demand reduction comprising a vehicle speed adjustment, a climate control setting, or a battery charge level.

20. The electric vehicle of claim 17, wherein the action comprises an execution of a transaction for a second quantity of renewable energy credits.

* * * * *